US011880706B2

(12) United States Patent
Que (10) Patent No.: US 11,880,706 B2
(45) Date of Patent: Jan. 23, 2024

(54) INTERRUPT CONTROL SYSTEM AND METHOD BASED ON RISC-V

(71) Applicant: NANJING QINHENG MICROELECTRONICS CO., LTD., Nanjing (CN)

(72) Inventor: Qinghe Que, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 0 days.

(21) Appl. No.: 17/997,774

(22) PCT Filed: Oct. 15, 2021

(86) PCT No.: PCT/CN2021/124167
§ 371 (c)(1),
(2) Date: Nov. 2, 2022

(87) PCT Pub. No.: WO2022/174600
PCT Pub. Date: Aug. 25, 2022

(65) Prior Publication Data
US 2023/0350711 A1    Nov. 2, 2023

(30) Foreign Application Priority Data

Feb. 22, 2021   (CN) .......................... 202110195097.6

(51) Int. Cl.
*G06F 9/48*      (2006.01)
*G06F 9/30*      (2018.01)
*G06F 9/32*      (2018.01)

(52) U.S. Cl.
CPC .......... *G06F 9/4812* (2013.01); *G06F 9/3004* (2013.01); *G06F 9/327* (2013.01)

(58) Field of Classification Search
CPC ....... G06F 9/4812; G06F 9/3004; G06F 9/327
See application file for complete search history.

(56) References Cited

U.S. PATENT DOCUMENTS

2021/0034558 A1 *   2/2021   Hu .......................... G06F 9/327

FOREIGN PATENT DOCUMENTS

CN          103778009 A       5/2014
CN          107015931 A       8/2017
(Continued)

OTHER PUBLICATIONS

Machine translation of CN109710312A (Year: 2019).*
Machine translation of CN 109376000A (Year: 2019).*
Machine translation of CN111831419A (Year: 2020).*

*Primary Examiner* — Glenn A. Auve
(74) *Attorney, Agent, or Firm* — CBM PATENT CONSULTING, LLC (57) ABSTRACT

A interrupt control system and method based on RISC-V comprises a processor, a fast interrupt controller, a Caller-save type general-purpose register, and a hardware memory area; the hardware memory area is used for storing a value of the Caller-save type general-purpose register during an interrupt response; and the fast interrupt controller is used for storing the value of the Caller-save type general-purpose register into the hardware memory area, or loading back a content from the hardware memory area into the Caller-save type general-purpose register, and further storing a value of a control and status register set into the hardware memory area when a nested interrupt occurs; which improve an interrupt handling speed of a RISC-V architecture processor, simplify the program development difficulty, expand an application field of the RISC-V as a core single chip microcomputer, and particularly have a wide prospect in the embedded application field.

16 Claims, 2 Drawing Sheets

(56) References Cited

FOREIGN PATENT DOCUMENTS

| | | | | |
|---|---|---|---|---|
| CN | 109376000 A | * | 2/2019 | ......... G06F 9/30098 |
| CN | 109710312 A | | 5/2019 | |
| CN | 111045730 A | | 4/2020 | |
| CN | 111831419 A | * | 10/2020 | |

* cited by examiner

FIG. 1

FIG. 2

INTERRUPT CONTROL SYSTEM AND METHOD BASED ON RISC-V

TECHNICAL FIELD

The present invention relates to the technical field of core interrupt handling, in particular to an interrupt control system and method based on RISC-V.

BACKGROUND

Figure 1:
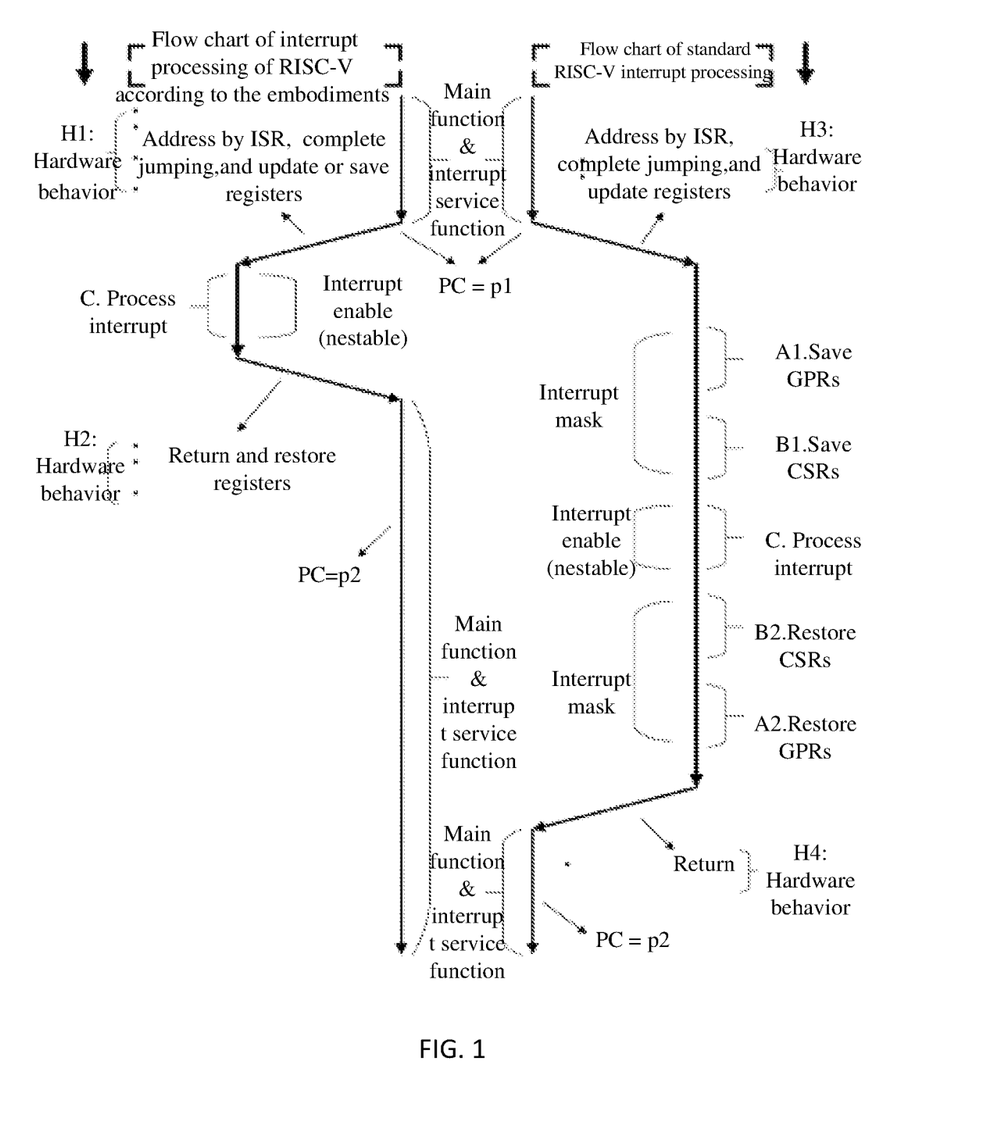
FIG. 1 is a diagram comparing a process of an existing standard interrupt response with a process of an interrupt control method based on RISC-V according to the embodiments.

RISC-V is an open-source instruction set architecture, which uses BSD License open-source protocol, has the characteristics of simplicity, expandability, easy programming/compiling/linking and the like, aims to become Linux in the instruction set architecture so as to be rival with ARM, and has been actively practiced and explored by the industry. However, the existing RISC-V interrupt controller solutions generally have the disadvantages of slow interrupt response speed, incapability of supporting nested interrupts or cumbersome operations, a large amount of context saving and restoring instructions, and the like. For example, the right side of FIG. 1 is listed as the existing RISC-V interrupt response flow chart, and in the figure, A1 and A2 are prologue/epilogue added by a compiler; B1 and B2 in the figure are contents added by the programmer in program, in order to support nested interrupts; C in the figure is the interrupt handling content completed by the programmer in the program; while H3 and H4 in the figure are hardware internal behaviors which are not controlled by instructions; wherein, request, response and program jumps are hardware internal behaviors, while context pushing, interrupt handling, context restoring and interrupt return inform the hardware of specific behaviors through software, which are named as software behaviors.

Standard RISC-V platform-level interrupt controller (PLIC) is a centralized interrupt management system, and each privileged mode provides only a single external interrupt signal (meip/seip/ueip) to the core. Centralized external interrupt management brings many disadvantages for single core and small system in the embedded field, such as the nesting of interrupt between the external interrupts cannot be generated in the same privileged mode (the RISC-V single chip microcomputer in the embedded field often only has machine mode interrupt, which means that the small single-core RISC-V system with only PLIC cannot complete the nesting management of the external interrupt, and in some embedded application fields, some task may not be possible specific functions).

A Core-Local interrupt controller designed by RISC-V Core-Local Interrupt Controller (CLIC) draft for solving the defect of PLIC nesting management can solve the nesting problem, but the software operation is complicated, the interrupt handling is slow, and the true purpose of interrupt nesting cannot be realized.

Additionally, the standard calling convention of the existing RISC-V specifies that a function saves a value of a general-purpose register on a stack before the general-purpose register is used, and the value of the general-purpose register needs to be restored to the original value before the function is completed. The general-purpose registers comprise Callee-save registers and Caller-save registers, for A (Caller) calling B (Callee), the Caller-save type is protected by the Caller, the Callee-save type is protected by the Callee, and a general compiling tool may add prologue before an interrupt service function for saving 16 sets of Caller-save registers, and add epilogue when exiting for restoring 16 sets of Caller-save registers, wherein the prologue and the epilogue are jointly responsible for the stack balance for saving/restoring hardware register values in the function. It is also reasonable that the prologue/epilogue is necessary and added to an ordinary function, but the addition of a large amount of prologue/epilogue to the interrupt service function may cause that the interrupt cannot be responded quickly, which might result in some real-time fields, the defects of difficulty in software development, low working efficiency and the likes.

SUMMARY

Object of the present invention: in order to solve the problems of slow interrupt response speed, high program development difficulty and the like of a RISC-V architecture processor in the prior art, the present invention provides an interrupt control system based on RISC-V.

Another object of the present invention is to provide an interrupt control method based on RISC-V.

Technical solutions: an interrupt control method based on RISC-V comprises an interrupt control, and the interrupt control comprises the following steps of:

(a1) receiving and responding to, by a processor, a first interrupt request, and stopping executing an original program stream;

(a2) saving a context by hardware, wherein the saving, by the hardware, the context comprises: storing, by a fast interrupt controller, a content in a Caller-save type general-purpose register into a hardware memory area; and program jumping, by the processor, to a first interrupt entry simultaneously when the hardware saves the context;

(a3) handling, by the processor, a first interrupt event; and (a4) once the first interrupt event is completed, returning to an original program breakpoint through an interrupt return instruction, and continuously executing the original program stream; and meanwhile, restoring, by the hardware, the context, wherein the restoring, by the hardware, the context comprises: loading back, by the fast interrupt controller, the content from the hardware memory area into the Caller-save type general-purpose register.

Further, the hardware memory area in the step (a2) and the step (a4) comprises a first-type memory area and a second-type memory area, the first-type memory area is used for storing the content of the control and status register set, and the second-type memory area is used for storing the content in the Caller-save type general-purpose register; the first-type memory area comprises at least a level 2 sub-memory area, and the second-type memory area comprises at least a level 1 sub-memory area and a level 2 sub-memory area.

Further, the saving, by the hardware, the context in the step (a2) refers to: storing the content in the Caller-save type general-purpose register before entering the first interrupt into the level 1 sub-memory area in the second-type memory area; and the restoring, by the hardware, the context in the step (a4) refers to: loading back the content from the level 1 sub-memory area in the second-type memory area into the Caller-save type general-purpose register.

Further, the step (a3) further comprises a nested interrupt, and the nested interrupt comprises the steps of:

(c1) when the processor is handling the first interrupt event, receiving and responding to a second interrupt request, and stopping handling the first interrupt event;

(c2) jumping, by the processor, to a second interrupt entry; meanwhile, updating the value of the control and status register set, storing the content of the Caller-save type general-purpose register before handling the second interrupt event into the level 2 sub-memory area of the second-type memory area, and/or storing the content of the control and status register set into the level 2 sub-memory area of the first-type memory area;

(c3) handling, by the processor, a second interrupt event; and (c4) once the second interrupt event is completed, returning to continue handling the first interrupt event; and meanwhile, loading back the content from the level 2 sub-memory area of the second-type memory area into the Caller-save type general-purpose register and/or loading back the content from the level 2 sub-memory area of the first-type memory into the control and status register set.

Further, sub-memory areas of the first-type memory area are set from the level 2 sub-memory area to a $m^{th}$ sub-memory area, sub-memory areas of the second-type memory area are set from the level 1 sub-memory area to a level n sub-memory, and m>n;

when the processor sends out a level n+1 nested interrupt in the process of handling a level n interrupt event, the following steps are executed:

(n1) receiving and responding to a $n+1^{th}$ interrupt request, and stopping handling the $n^{th}$ interrupt event;

(n2) program jumping, by the processor, to a n+1 th interrupt entry, and meanwhile, storing the content in the control and status register set before handling a $n+1^{th}$ interrupt event begins to be processed into a level n+1 sub-memory area of the first-type memory area, and then protecting the content in the Caller-save type general-purpose register before handling the $n+1^{th}$ interrupt event by software, without accessing the second-type memory area;

(n3) handling, by the processor, the $n+1^{th}$ interrupt event; and (n4) once the $n+1^{th}$ interrupt event is completed, restoring the content in the Caller-save type general-purpose register by software, then returning to continuously process the nth interrupt event, and meanwhile, loading back a content from the level n+1 sub-memory area into the control and status register set.

Further, the step (n2) is implemented by setting a hardware memory area enhanced control bit HS_ENHANCE to 1;

a programmable fast interrupt control register is added, and the programmable fast interrupt register comprises the hardware memory area enhanced control bit;

when HS_ENHANCE is 1, when the $n+1^{th}$ interrupt occurs, the program jumps and stores the content in the control and status register set before handling the $n+1^{th}$ interrupt event into the level n+1 sub-memory area of the first-type memory area without accessing the second-type memory area, and then the content in the Caller-save type general-purpose register before handling the $n+1^{th}$ interrupt event is protected by software; after the interrupt handling is finished, the software restores the content of the Caller-save type general-purpose register, returns to continuously process the n th interrupt event and simultaneously loads back the content from the level n+1 sub-memory area of the first-type memory area into the control and status register set; and when HS_ENHANCE is 0, the interrupt is masked, and the $n+1^{th}$ interrupt does not occur.

Further, the method of updating the value of the control and status register set in the step (c2) comprises: the control and status register set containing a machine mode status register, and the machine mode status register containing an interrupt enable bit MIE; when MIE=1, maintaining interrupt enable; and when MIE=0, masking the interrupt; and when any one of the following conditions occurs in the interrupt response process, setting MIE to be 0; otherwise, setting MIE to be 1:

when the nested interrupt is closed or the first-type memory area does not exist;

when the nested interrupt is opened but the first-type memory area is full; and when the second-type memory area is full and HS_ENHANCE=0.

Further, a task switching interrupt is further comprised, wherein the task switching interrupt comprises the following steps of:

(b1) searching, by a task scheduler, a ready task with a highest priority in a task ready list, and determining a new task to be switched;

(b2) saving an original task context to an original task stack space; and (b3) masking all interrupts; and after the interrupts are masked, popping up a context content from a new task stack space, returning to a new task breakpoint through an interrupt return instruction to continuously execute, and releasing interrupt masking.

Further, the method of masking all interrupts in the step (b3) comprises: adding a programmable quick interrupt control register which comprises a hardware memory area temporary off control bit HS_OFF_T; and when HS_OFF_T is 1, masking all interrupts, and not executing a popup operation of the hardware memory area when exiting the interrupts.

An interrupt control system and method based on RISC-V comprises a processor, a fast interrupt controller, and a Caller-save type general-purpose register, and further comprises a hardware memory area; the hardware memory area is used for storing a value of the Caller-save type general-purpose register before interrupt handling during an interrupt response; and the fast interrupt controller is used for storing the value of the Caller-save type general-purpose register into the hardware memory area or storing a content of the hardware memory area into the Caller-save type general-purpose register.

Further, a control and status register set is further comprised, wherein the hardware memory area is used for storing a value of the control and status register and/or the value of the Caller-save type general-purpose register before nested interrupt handling during a nested interrupt response; and the fast interrupt controller is used for storing the value of the control and status register and/or the value of the Caller-save type general-purpose register into the hardware memory area or storing the content of the hardware memory area into the control and status register and/or the Caller-save type general-purpose register.

Further, the hardware memory area comprises a first-type memory area and a second-type memory area, the first-type memory area is used for storing a content of the control and status register set, and the second-type memory area is used for storing the content in the Caller-save type general-purpose register; and the first-type memory area comprises at least a level 2 sub-memory area, and the second-type memory area comprises at least a level 1 sub-memory area and a level 2 sub-memory area.

Further, one or more of a flip-flop, a latch, and a RAM type memory medium are employed as the hardware memory area.

Further, the control and status register set comprises a programmable fast interrupt vector table mode register, the programmable fast interrupt vector table mode register contains a mode bit MODE, when MODE=1, an absolute address is stored in the vector table, and when MODE=0, a jump instruction is stored in the vector table.

Further, the control and status register set further comprises a programmable fast interrupt control register, and the programmable fast interrupt control register comprises a hardware memory area temporary off control bit HS_OFF_T;

when HS_OFF_T=1, interrupt masking is opened and an operation of restoring the Caller-save type general-purpose register by the hardware memory area when exiting the interrupt, and simultaneously HS_OFF_T is cleared to 0 by an interrupt exit instruction; and when HS_OFF_T=0, no effect is produced on interrupt enable.

Further, the control and status register set further comprises a programmable fast interrupt control register, and the programmable fast interrupt control register comprises a hardware memory area enhanced control bit HS_ENHANCE;

when HS_ENHANCE=1, the first-type memory area is not full and the second-type memory area is full, during an interrupt response, the content of the Caller-save type general-purpose register is protected by software, and the content of the control and status register set is stored in the first-type memory area; and when exiting the interrupt, the content of the Caller-save type general-purpose register is restored by software, and the content is loaded back from the first-type memory area into the control and status register set; and when HS_ENHANCE=0, neither the first-type memory area nor the second-type memory area is full, during an interrupt response, the content of the Caller-save type general-purpose register is stored in the second-type memory area, and the content of the control and status register set is stored in the first-type memory area; and when exiting the interrupt, the content is loaded back from the second-type memory area into the Caller-save type general-purpose register, and the content is loaded back from the first-type memory area into the control and status register set; and when the second-type memory area is full, the interrupt is masked.

Further, the control and status register set further comprises a machine mode status register, and the machine mode status register comprises an interrupt enable bit MIE; when MIE=1, interrupt enable is maintained; and when MIE=0, the interrupt is masked; and when any one of the following conditions occurs in the interrupt response process, MIE is set to be 0; otherwise, MIE is set to be 1:

when the nested interrupt is closed or the first-type memory area does not exist;

when the nested interrupt is opened but the first-type memory area is full; and when the second-type memory area is full and HS_ENHANCE=0.

Beneficial effects: comparing the interrupt control system and method based on RISC-V provided by the present invention with the prior art, the system is provided with the hardware memory area, the fast interrupt controller, the quick interrupt entry and a plurality of interrupt addressing modes, not only solve the defects of slow response speed, cumbersome control and a large amount of context memory instructions of the RISC-V interrupt controller, but also ensure the completeness and effectiveness of an optimization function in an embedded OS system. Real-time nesting can finish the fast preemption of a high-priority task. Meanwhile, based on the optimized interrupt response process, the problem of program abnormity caused by non-precise interrupt in the process of interrupt global closing can be effectively solved, and redundant software operation is avoided. The method can greatly improve an interrupt handling speed of a RISC-V architecture processor, simplify the program development difficulty, and expand an application field of the RISC-V as a core single chip microcomputer. The interrupt control system and method based on RISC-V particularly have a wide prospect in the embedded application field.

H1 update or save registers includes: Update MEPC, MCAUSE and MSTATUS registers; Save the MEPC, MCAUSE and MSTATUS registers to the hardware memory area-CSRs; Save the Caller-Save set general-purpose register to the hardware memory area-GPRs.

H2 Return and restore registers includes: Return to a breakpoint according to a MEPC value and continuously execute; Restore from the hardware memory area-CSRs area to MEPC, MCAUSE and MSTATUS registers; Restore from the hardware memory area-GPRs area to a Caller-Save set register set.

H3 Update registers includes: Update MEPC, MCAUSE and MSTATUS registers.

H4 Return includes:Return to a breakpoint according to a MEPC value and continuously execute.

Fast interrupt controller includes: Priority arbitration; Preemption arbitration; Enable; Threshold.

Fast interrupt controller controls write: Write control of hardware memory area.

Fast interrupt controller controle read: Read control of hardware memory area.

CSRs includes: MEPC; MSTATUS; MCAUSE; MTVAL.

GPRs includes: Caller-save set; Callee-save set.

Interrupts access sub-memory area includes: Not perform the first interrupt access of the first-type memory area;

First interrupt access $2^{nd}$-level 1 sub-memory area;

. . .

$n^{th}$ interrupt access $2^{th}$-level n sub-memory area;

(n+1)th to (m)th interrupts, GPRs is protected/restored by adding instructions to a tool chain.

DETAILED DESCRIPTION

The present invention will be further described below with reference to the accompany drawings and specific embodiments.

Figure 2:
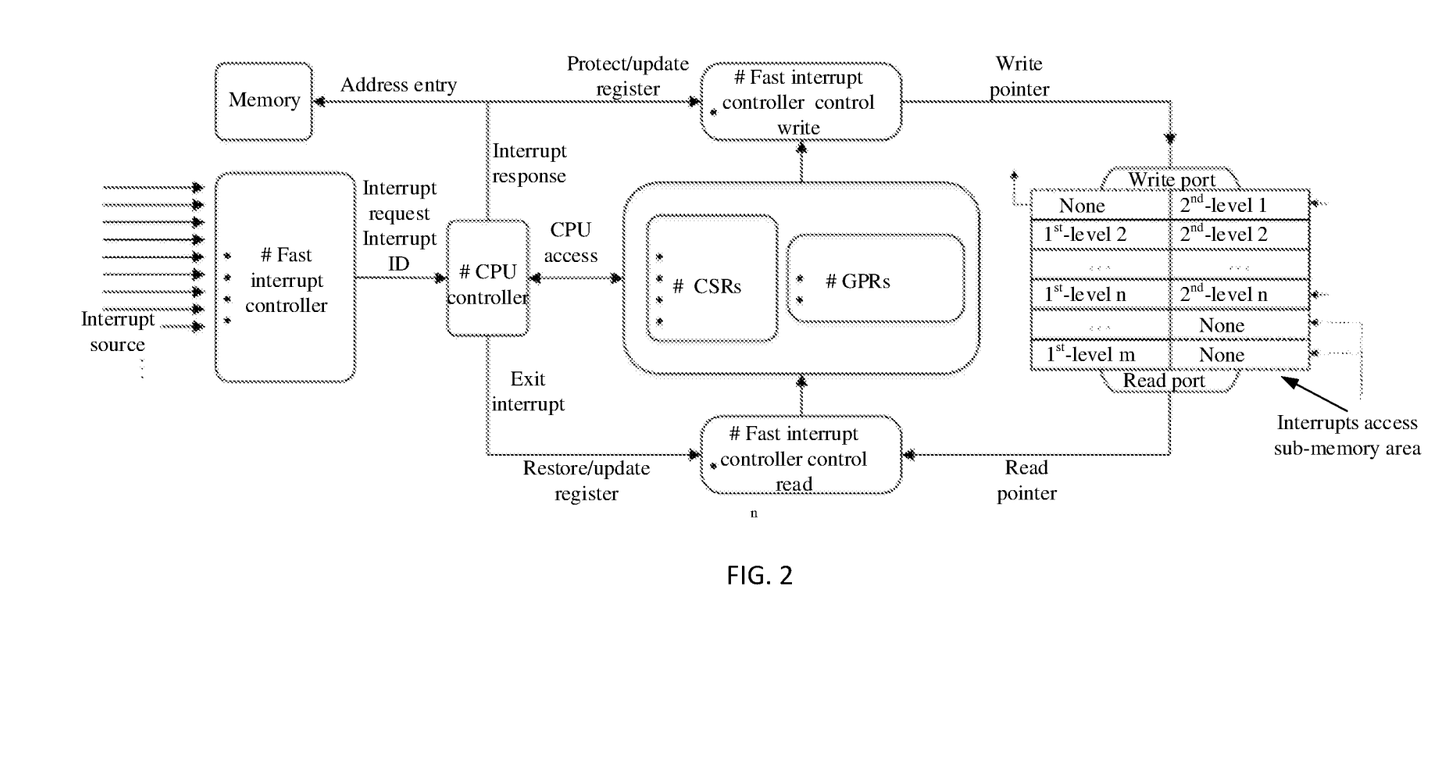
FIG. 2 is a structural block diagram of an interrupt control system based on RISC-V according to the embodiments.

As shown in FIG. 2, an interrupt control system based on RISC-V comprises a processor CPU, a fast interrupt controller, a control and status register set (CSRs), a general-purpose register, and a hardware memory area. The hardware memory area is used for storing a value of the control and status register set and/or a value of the Caller-save type general-purpose register before interrupt handling during an interrupt response. The fast interrupt controller is used for receiving an external interrupt source, judging conditions such as interrupt enable, priority and threshold, and sending an interrupt request to the processor, and is also used for storing the value of the control and status register set and/or the value of the Caller-save type general-purpose register into the hardware memory area, or storing the content of the hardware memory area into the control and status register set and/or the Caller-save type general-purpose register.

The hardware memory area is not limited to an implementation mode thereof, memory media such as a flip-flop, a latch and a RAM may be employed as the hardware memory area, and an application range of the hardware memory area is wide.

The hardware memory area comprises a first-type memory area and a second-type memory area, the first-type memory area is used for storing a content of the CSRs, which only needs to be stored when an nested interrupt occurs, and is used for better supporting the nested interrupt, and avoiding cumbersome operations such as interrupt masking, CSRs memory, masking releasing and the like. The second-type memory area is used for storing the Caller-save type general-purpose register and is used for fast handling interrupts, and avoiding the defect that interrupt handling is slow due to excessive prologue/epilogue operations.

The first-type memory area is unnecessary, and if only the second-type memory area exists, the second-type memory area may be used in a non-nested interrupt scene, or the existing CLIC standard nested process is used for realizing nested interrupt.

The first-type memory area and the second-type memory area may each comprise multiple-level sub-memory areas, and different nested interrupts may store the content of the register set in sub-memory areas of different levels. The number of the sub-memory areas contained by the first-type memory area and the second-type memory area may be different, sub-memory areas of the first-type memory area are from the level 2 sub-memory area to an level m sub-memory area, sub-memory areas of the second-type memory area are set from the level 1 sub-memory area to an level n sub-memory area, and m>n may be provided. For example, the second-type memory area comprises a level 1 sub-memory area, a level 2 sub-memory area, and a level 3 sub-memory area, and the first-type memory area comprises a level 2 sub-memory area and a level 3 sub-memory area (because the level 1 interrupt does not require the first-type memory area for memory, the first-type memory area does not exist in the level 1 sub-memory area). This design is because that the content of the Caller-save type general-purpose register needs more space than the control and status register set, and in order to improve a utilization rate of the hardware memory area, a level number of the sub-memory area of the first-type memory area is designed to be larger than that of the second-type memory area. When a number of times of nested interrupt is larger than the level number of the sub-memory areas of the second-type memory area, the content of the Caller-save type general-purpose register may be protected by software according to the method in the prior art, so that the nested interrupt can be normally carried out.

The control and status register set comprises a programmable fast interrupt (FPIC) vector table mode register, the programmable fast interrupt vector table mode register contains a mode bit MODE, when MODE=1, a 32-bit absolute address is stored in the vector table, and when MODE=0, a jump instruction is stored in the vector table. When storing the absolute address, the processor performs an offset with respect to the base address based on a corresponding interrupt number, thereby performing an addressing operation of an interrupt service function. Compared with a plurality of uncompressed jump instructions in a vector table in the prior art, it is jumped to an interrupt service function entry through the jump instructions; for a 32-bit RISC-V, a JAL instruction addressing range is +/−1 M, and using the absolute address of the embodiment for addressing can expand the addressing range to cover 4 G space.

The control and status register set further comprises a programmable fast interrupt (FPIC) control register, and the programmable fast interrupt control register comprises a hardware memory area temporary off control bit HS_OFF_T;

when HS_OFF_T=1, interrupt masking is opened and the context is not restored by hardware when exiting the interrupt; and when HS_OFF_T=0, interrupt masking is released, and no effect is produced on interrupt enable.

The programmable fast interrupt control register further comprises a hardware memory area enhanced control bit HS_ENHANCE;

when HS_ENHANCE=1, the first-type memory area is not full and the second-type memory area is full, during an interrupt response, the content of the Caller-save type general-purpose register is protected by software, and the content of the control and status register set is stored in the first-type memory area; and when exiting the interrupt, the content of the Caller-save type general-purpose register is restored by software, and the content is loaded back from the first-type memory area into the content of the control and status register set; and when HS_ENHANCE=0, neither the first-type memory area nor the second-type memory area is full, during an interrupt response, the content of the Caller-save type general-purpose register is stored in the second-type memory area, and the content of the control and status register set is stored in the first-type memory area; and when exiting the interrupt, the content is loaded back from the second-type memory area into the Caller-save type general-purpose register, and the content is loaded back from the first-type memory area into the control and status register set.

The control and status register set further comprises a machine mode status register, and the machine mode status register comprises an interrupt enable bit MIE; when MIE=1, interrupt enable is maintained; and when MIE=0, the interrupt is masked; and when any one of the following conditions occurs, MIE is set to be 0; otherwise, MIE is set to be 1:

when the nested interrupt is closed or the first-type memory area does not exist;

when the nested interrupt is opened but the first-type memory area is full; and when the second-type memory area is full and HS ENHANCE=0.

An interrupt control method based on RISC-V comprises a normal interrupt control and a task switching interrupt.

1. Normal interrupt control

As shown in FIG. 1, the normal interrupt control comprises the following steps of:

(a1) receiving and responding to, by a processor, a first interrupt request, and stopping executing an original program stream;

(a2) saving a context by hardware, wherein the saving, by the hardware, the context comprises: storing, by a fast interrupt controller, a content in a Caller-save type general-purpose register into a hardware memory area; and program jumping, by the processor, to a first interrupt entry simultaneously when the hardware saves the context;

(a3) handling, by the processor, a first interrupt event; and (a4) once the first interrupt event is completed, returning to an original program breakpoint through an interrupt return instruction (mret), and continuously executing the original program stream; and meanwhile, restoring, by the hardware, the context, wherein the restoring, by the hardware, the context comprises: loading back, by the fast interrupt controller, the content from the hardware memory area into the Caller-save type general-purpose register, such as an H2 behavior in FIG. 1.

The following compares the existing interrupt service function with C call as an example with the method provided in this embodiment:

Description of the existing interrupt service function with C call:

```
01 ##################################################
02 # RISC-V standard interrupt service function
03 ##################################################
04 void_attribute_((interrupt))
05 SysTick_Handler (void)
06 {
07 Regular_C_Call();
08 }
09
<SysTick_Handler>:
11 addi sp,sp,–64 # Create a frame on stack for full caller-save
12 sw ra,60(sp) # Save ra
13 sw t0,56(sp) # Save t0
14 sw t1,52(sp) # Save t1
15 sw t2,48(sp) # Save t2
16 sw a0,44(sp) # Save a0
17 sw a1,40(sp) # Save a1
18 sw a2,36(sp) # Save a2
19 sw a3,32(sp) # Save a3
20 sw a4,28(sp) # Save a4
21 sw a5,24(sp) # Save a5
22 sw a6,20(sp) # Save a6
23 sw a7,16(sp) # Save a7
24 sw t3,12(sp) # Save t3
25 sw t4,8(sp) # Save t4
26 sw t5,4(sp) # Save t5
27 sw t6,0(sp) # Save t6
28 jal Regular_C_Call # Nested regular c call
29 1 w ra,60(sp) # Restore ra
30 1 w t0,56(sp) # Restore t0
31 1 w t1,52(sp) # Restore t1
32 1 w t2,48(sp) # Restore t2
33 1 w a0,44(sp) # Restore a0
34 1 w a1,40(sp) # Restore a1
35 1 w a2,36(sp) # Restore a2
36 1 w a3,32(sp) # Restore a3
37 1 w a4,28(sp) # Restore a4
38 1 w a5,24(sp) # Restore a5
39 1 w a6,20(sp) # Restore a6
40 1 w a7,16(sp) # Restore a7
41 1 w t3,12(sp) # Restore t3
42 1 w t4,8(sp) # Restore t4
43 1 w t5,4(sp) # Restore t5
44 1 w t6,0(sp) # Restore t6
45 addi sp,sp,64 # Free stack frame
46 mret # Return from handler
47 #---#
```

In the above, the lines 11-27 are contextual stacking behaviors, and the line 11 opens up a stack space for storing the Caller-save type general-purpose register; the lines 12-27 push an internal register of the CPU to the stack space; (the lines 11-27, i.e., prologues added by a standard compiler for saving 16 sets of Caller-save type general-purpose registers); the line 28 calls an interrupt service function for interrupt handling; the lines 29-45 restore the internal register of the CPU from the stack space and release the stack space; and the line 46 exits interrupt restoring and returns back to the interrupt breakpoint to continue program execution by using a mret instruction (the lines 29-46, i.e., epilogues added by the standard compiler, used for restoring the 16 sets of Caller-save type general-purpose registers).

The RISC-V interrupt response process adopting the hardware memory area solution of the patent comprises the steps of requesting, responding, protecting the context by hardware, and program jumping, interrupt handling, restoring the context by hardware, and restoring the program stream and the like. The requesting, the responding, the protecting the context by the hardware, and the program jumping are hardware internal behaviors, and the interrupt handling and the interrupt return are specific behaviors informed to the hardware by the software, which are referred to as software behaviors here.

Description of the interrupt service function adopting the method:

```
01##################################################
02 # hardware stack RISC-V standard service function
03 ##################################################
04 void_attribute_((interrupt("HW_STACK")))
05 SysTick_Handler (void)
06 {
07 Regular_C_Call();
08 }
09
10 <SysTick_Handler>:
11 jal Regular_C_Call # Nested regular c call
12 mret # Return from handler
13 #---#
```

In the above, the line 11 performs function call and interrupt handling; and the line 12 exits the interrupt using the mret instruction.

As can be seen from the above comparison, with the method provided in this embodiment, 17 instructions are saved before interrupt handling (at least 17 cycles are required for executing the prologue in a typical single-emission pipeline architecture CPU, and a large amount of memory bandwidth is occupied, and in this case, a high-speed interface in the system cannot obtain bus authority, and cannot complete a specific task), and 17 instructions are saved between the end of the interrupt handling and the interrupt return (at least 17 cycles are required for executing the epilogue in the typical single-emission pipeline architecture CPU, and a large amount of memory bandwidth is occupied). It can be seen through analyzing the instructions that the solution provided by the embodiment has the advantages of saving code space, accelerating the interrupt handling speed, releasing the bandwidth of the memory and improving the overall performance of a single chip microcomputer. Compared with a typical RISC-V architecture, the method has obvious advantages in the embedded application field, and particularly provides a more optimized solution and a wider application field for the development of products in some scenes with high interrupt response speed and real-time performance.

Because in the existing interrupt response, when a GCC translates a function body in a C/C language into an assembly language, each function may use some general-purpose registers. However, the number of the general-purpose registers is limited, which requires the function to save the value of the general-purpose register on the stack before using the general-purpose register, and to restore the value of the general-purpose register to the original value before the function ends. The GCC adds one prologue at the beginning of each function and one epilogue at the end of each function, and the prologue/epilogue is the stack balance responsible for saving/restoring the value of the general-purpose register in the function. Therefore, the method needs to add and define one attribute, and does not store and restore the general-register according to the method in the prior art after the interrupt response, but adopts the defined method to execute a subsequent task, and the specific method is as follows: performing basic interrupt configuration (e.g., enable, threshold, priority, etc.), opening a memory function of the hardware memory area, and meanwhile, adding a new attribute to the interrupt service function using _attribute_((interrupt("HW_STACK"))) shown in the line 4. This attribute is used to inform the compiler to not add prologue/epilogue to this interrupt service function; otherwise the compiler will still save and restore the hardware registers according to the original rules.

2. Task Switching Interrupt

For a system with coexistence of the normal interrupt and the task switching interrupt, task switching also needs to be realized through interrupt. A task scheduler mainly works for two items, i.e., searching a ready task with a highest priority in a task ready list and realizing task switching, wherein interrupt is usually utilized in the task switching to realize switching of breakpoint data. The switching of the breakpoint data needs to push a register of an original task into a task stack during the interrupt, and then pop up a register content of a task stack of a new task into the register of the CPU. The interrupt control method provided in this embodiment not only supports fast context saving and restoring for a conventional normal interrupt application, but also can implement fast context saving and restoring for a normal interrupt and can realize the object of completing task switching by a task switching interrupt, through a simple configuration in an OS system with coexistence of a task switching interrupt and a normal external interrupt.

The task switching interrupt comprises the following steps of:

(b1) searching, by a task scheduler, a ready task with a highest priority in a task ready list, and determining a new task to be switched;

(b2) saving an original task context to an original task stack space; and (b3) masking all interrupts, wherein the specific method comprises: defining a programmable fast interrupt (FPIC) control register which comprises a hardware memory area temporary off control bit HS_OFF_T, when the hardware memory area temporary off control bit is 1, masking all interrupts, and not executing a popup operation of the second-type memory area when exiting the interrupts.

After the interrupts are masked, a context content is popped up from a new task stack space, and returned to a new task breakpoint through an interrupt return instruction to continuously execute, and the interrupt masking may be released after the context is popped up in the new task stack space: the hardware automatically clears HS_OFF_T.

Basic interrupt configuration (such as enabling, threshold, priority and the like) are performed, then the memory function of the hardware memory area is opened, the normal interrupt service function and the task switching interrupt are defined by using _attribute_((interrupt("HW_STACK"))) attributes, HS_OFF_T is configured to be 1 before the register content of the new task are popped up by the task switching, thereby masking all interrupts, preventing other interrupts from destroying the popped Caller-save type general-purpose register of the new task, and simultaneously the function of restoring the context by the hardware may not be executed when exiting the current interrupt, thus preventing a hardware stack-out function from destroying the popped Caller-save type general-purpose register of the new task. The interrupt masking may be released once the register content of the new task is popped up.

3. Nested Interrupt

In addition to single interrupt, the present method also supports nested interrupt. The control method of the nested interrupt comprises the following steps of:

(a1) receiving and responding to, by a processor, a first interrupt request, and stopping executing an original program stream;

(a2) saving a context by hardware, wherein the saving, by the hardware, the context comprises: storing, by a fast interrupt controller, a content in a Caller-save type general-purpose register before entering a first interrupt into the level 1 sub-memory area of the second-type memory area; and jumping, by the processor, to a first interrupt entry simultaneously when the hardware saves the context;

(a3) handling, by the processor, a first interrupt event;

(c1) when the processor is handling the first interrupt event, receiving and responding to a second interrupt request, and stopping handling the first interrupt event; and (c2) jumping, by the processor, to a second interrupt entry; and meanwhile, updating the value of the control and status register set (MEPC=p1 (PC=p1, program breakpoint), MCAUSE=interrupt serial number, MSTATUS. MIE=1 (maintaining interrupt enable), MSTATUS. MPIE=MSTATUS. MIE, MSTATUS. MPP=privileged mode before interrupt), storing the content of the Caller-save type general-purpose register before handling the second interrupt event into the level 2 sub-memory area of the second-type memory area, and/or storing the content of the control and status register set before handling the second interrupt event into the level 2 sub-memory area of the first-type memory area.

When neither the first-type memory area nor the second-type memory area is full, both the CSRs and the Caller-save type general-purpose register may be normally stored in the hardware memory area, but if the first-type memory area is full (even the first-type memory area is not set from the beginning), the value of the CSRs can be protected by software according to the existing standard nested interrupt mode as long as being popped up before exiting the interrupt, and in this case, MSTATUS.MIE is cleared to 0 before entering the interrupt service function for masking the interrupt. If the second-type memory area is full (i.e., m>n as described above), nested interrupt occurs for n+1$^{th}$ times, the CSRs can be normally stored, the value of the Caller-save type general-purpose register is protected by software (programmer self-protection) according to the existing standard interrupt mode, no operation is performed on the second-type memory area to prevent content damage caused by overflow of the second-type memory area. This step is realized by defining the hardware memory area enhanced control bit HS_ENHANCE in the programmable fast interrupt register, when HS_ENHANCE=1, the above step is executed, and the nesting can be more, but the requirement on the programmer is higher, and the following three approaches need to be adopted to push the stack according to the existing standard nested interrupt mode to avoid context damage: 1. the level n+1 interrupt is processed by using an assembly language; 2. c call is not carried out on the level n+1 interrupt; and 3. when the attribute_of the level n+1 interrupt is interrupted, no new attribute is added (the n+1$^{th}$ interrupt may be determined by an interrupt priority level existing in the system, only interrupts with priority greater than n may occur in the n+1$^{th}$ interrupt, and interrupts with priority less than or equal to n may only occur in the 1$^{st}$ to level n interrupts). When HS_ENHANCE=0, the MIE of the hardware may be automatically closed when the second-type memory area is full; in this case, if an interrupt with a higher priority comes, the interrupt controller does not send the interrupt request to the CPU, and when the hardware memory area of the CPU meets the requirement, the interrupt request can only be responded by the CPU.

The MSTATUS above is a machine mode status register, wherein the MIE is an interrupt enable bit in the machine mode status register, and the nested interrupt defined in this embodiment maintains the MIE as 1 during an interrupt response, so that the interrupt may not be masked;

(c3) handling, by the processor, a second interrupt event;

(c4) once the second interrupt event is completed, returning to continue handling the first interrupt event; and meanwhile, loading back the content from the level 2 sub-memory area of the second-type memory area into the Caller-save type general-purpose register and/or loading back the content from the level 2 sub-memory area of the first-type memory area into the control and status register set.

(a4) After the first interrupt event is processed, returning to an interrupt breakpoint through an interrupt return instruction (mret), and continuously executing the original program stream; and meanwhile, restoring, by the hardware, the context, wherein the restoring, by the hardware, the context comprises: loading back, by the fast interrupt controller, the content from the level 2 sub-memory area of the second-type memory area into the Caller-save type general-purpose register.

The existing standard CLIC nested interrupt is compared with the nested interrupt provided by the embodiment as follows:

Description of interrupt service function of standard CLIC nested interrupt:

```
01 ##################################################
02 # process of standard CLIC nested interrupt
03 ##################################################
04 /* ---
05 Small ISR to poke device to clear interrupt
06 and increment in-memory COUNTER.
07 ---*/
08 void_attribute_((interrupt))
09 SysTick_Handler (void)
10 {
11 extern volatile int INTERRUPT_FLAG;
12 extern volatile int COUNTER;
13 INTERRUPT_FLAG=0;
14 _atomic_fetch_add (&COUNTER, 1,_ATOMIC_RELAXED);
15 }
16
17 <SysTick_Handler>:
18 #---interrupts disabled on entry---#
19 addi sp, sp, -framesize # create a frame on stack.
20 sw a0, offset(sp) # save working register.
21 csrr a0, mcause # read cause.
22 sw a1, offset(sp) # save working register.
23 csrr a1, mepc # read epc.
24 csrrsi x0, mstatus, mie # enable interrupts.
25 #---interrupts enabled---#
26 sw a0, offset(sp) # save cause on stack.
27 sw x0, INTERRUPT FLAG, a0 # clear interrupt flag.
28 sw a1, offset(sp) # save epc on stack.
29 l a a0, COUNTER # get COUNTER address.
30 l i a1, 1
31 amoadd.w x0, (a0), a1 # increment COUNTER in memory.
32 l w a1, offset(sp) # restore epc
33 l w a0, offset(sp) # restore cause
34 csaci x0, mstatus, mie # disable interrupts.
35 #---interrupts disabled---#
36 csrw mepc, a1 # put epc back.
37 l w a1, offset(sp) # restore a1.
38 csrw mcause, a0 # put cause back.
39 l w a0, offset(sp) # restore a0.
40 addi sp, sp, framesize # free stack frame.
41 mret # return from handler.
42 #---#
```

As above, the standard CLIC interrupt controller uses software to perform the interrupt nesting function, the lines 19-24 are in an interrupt mask status, while mecc and mcause are stored in a0, a1 (if the interrupt is not masked, a0 and a1 may be damaged by the interrupt with high priority), the lines 26-34 are in preemptible status (the interrupt global enable is turned on), at which stage the software completes the operations of defined INTERRUPT-FLAG zero-clearing and COUNTER++. The lines 36-41 are in an interrupt mask status, while the mcp and the mcause are restored from a0 and a1 (if the interrupt is not masked, a0 and a1 may be damaged by the interrupt with high priority), and the line 41 exits the interrupt. In addition, the interrupt closing/opening, and the memory restoration of the mcp and the mcause are not realized in the existing tool chain, so that the operation in the interrupt service function cannot complete the protection of the register through a compiler, which requires a programmer to automatically adopt assembly codes for programming, thus greatly increasing the program development difficulty.

Description of nested interrupt service function provided by the embodiment:

```
01 ##################################################
02 # process of standard FPIC nested interrupt (hardware stack off status)
03 ##################################################
04 /* ---
05 Small ISR to poke device to clear interrupt
06 and increment in-memory counter.
07 ---*/
08 void_attribute_((interrupt))
09 SysTick_Handler (void)
10 {
11 extern volatile int INTERRUPT FLAG;
12 extern volatile int COUNTER;
13 INTERRUPT_FLAG=0;
```

```
14 _atomic_fetch_add (&COUNTER, 1,_ATOMIC_RE-
   LAXED);
15 }
16
17 <SysTick_Handler>:
18 #-----interrupts enabled---#
19 addi sp, sp, -framesize # create a frame on stack.
20 sw a0, offset(sp) # save working register.
21 sw a1, offset(sp) # save working register
22 sw x0, INTERRUPT FLAG, a0 # clear interrupt flag.
23 1 a a0, COUNTER # get counter address.
24 1 i a1, 1
25 amoadd.w x0, (a0), a1 # increment counter in memory.
26 1 w a1, offset(sp) # restore epc
27 1 w a0, offset(sp) # restore cause
28 addi sp, sp, framesize # free stack frame.
29 mret # return from handler.
30 #---#
```

From the above comparison, it can be seen that in the existing method, the hardware clears the MIE while responding to the interrupt (the MIE is cleared in an H3 hardware behavior in FIG. 1), all the machine mode interrupts are masked according to the description of the MIE, and in a typical embedded RISC-V single chip microcomputer, external interrupts are often defined as machine mode interrupts, which means that once there is an interrupt response, the hardware masks all the rest of the external interrupts. The nested interrupt defined in this embodiment maintains the MIE to be 1 (H1 hardware behavior in FIG. 1) during an interrupt response, so that interrupts are not marked, the whole process of interrupt requesting, responding, handling and exiting is in a preemptible status, and after entering an interrupt function, operations such as storing the mepc and the mcause, closing/opening interrupt enable, and the like are not required. The method is completely compatible with the existing tool chain, meets the design targets of easy programming/easy linking of RISC-V, and the interrupt service function can be completely written by adopting C codes without worrying about the situation of context damage.

When an external interrupt source is sent into the fast interrupt controller, the fast interrupt controller judges conditions such as interrupt enable, priority and threshold, and sends an interrupt request to a CPU after arbitration; the CPU returns an interrupt response to the fast interrupt controller after getting ready, informs a RISC-V CSRs module to update registers such as mstatus, mcpc and mcause, conditionally stores 16 sets of Caller-save type general-purpose registers in the GPRs into the hardware memory area according to the configuration of relevant control bits of CSRs fpic_cr1, and meanwhile, the CPU concurrently performs operations such as prefetching of addressing instructions of an interrupt entry. According to the description, a delay of the CPU to the hardware for running an interrupt handling function (i.e., the Regular_C_ Call function behavior above) in response to an interrupt request depends on the addressing of the interrupt entry and the maximum value of CPU register cycles maintained by the hardware. This value is much shorter than the time of the register maintained by the software in the prior art (because 16 memory access instructions exist in the lines 11-27, the concurrent handling of the form of addressing and saving instructions by the hardware is certainly faster, meanwhile, the hardware memory area is provided with independent bandwidth, the CPU is tightly coupled, and the bandwidth of the external memory is not occupied, so the speed is further accelerated; meanwhile, the implementation mode of the hardware memory area is not limited, the hardware memory area can adopt flexible behaviors such as a faster register or a latch or a high-bandwidth RAM, and make flexible changes according to factors such as an actual MCU external control circuit, memory type selection and the like, and a hardware stack area constructed by adopting the latch and the register mode can finish the saving and restoring operation of the CPU register in a single cycle). The solution of saving the interrupt context in the hardware memory area needs to maintain 16 sets of GPRs, and the nested interrupt function needs to maintain at least mstatus, mepc and mcause registers, and the two types of registers may be used separately or in combination. When the CPU executes a mret interrupt return instruction to exit the interrupt, the fast interrupt controller loads back the content from the hardware memory area into the CPU register.

What is claimed is:

1. An interrupt control method based on RISC-V, comprising an interrupt control, wherein the interrupt control comprises the following steps of:
   (a1) defining an attribute of an interrupt service function which determines that the interrupt service function does not contain an instruction for protecting/recovering a value of a general-purpose register, receiving and responding to, by a processor, a first interrupt request, and stopping executing an original program stream;
   (a2) saving a context by hardware, wherein the saving, by the hardware, the context comprises: storing, by an interrupt controller, a content in a Caller-save type general-purpose register into a hardware memory area; and program jumping, by the processor, to a first interrupt entry simultaneously when the hardware saves the context;
   (a3) handling, by the processor, a first interrupt event; and
   (a4) once the first interrupt event is completed, the processor immediately returning to an original program breakpoint through an interrupt return instruction, and continuously executing the original program stream; and meanwhile, restoring, by the hardware, the context, wherein the restoring, by the hardware, the context comprises: loading back, by theme interrupt controller, the content from the hardware memory area into the Caller-save type general-purpose register; wherein the hardware memory area comprises a first-type memory area and a second-type memory area, the first-type memory area is used for storing a content of a control and status register set, and the second-type memory area is used for storing the content in the Caller-save type general-purpose register; the first-type memory area comprises at least a level 2 sub-memory area, the level 2 sub-memory area of the first-type memory area is used for storing the content of the control and status register set before an interrupt preemption, the second-type memory area comprises at least a level 1 sub-memory area and a level 2 sub-memory area, the level 1 sub-memory area of the second-type memory area is used for storing the content of the Caller-save type general-purpose register before entering a first interrupt, and the level 2 sub-memory area of the second-type memory area is used for storing the content in the Caller-save type general-purpose register before entering the interrupt preemption.

2. The interrupt control method based on RISC-V according to claim 1, wherein the saving, by the hardware, the context in the step (a2) refers to: storing the content in the Caller-save type general-purpose register before entering the first interrupt into the level 1 sub-memory area in the second-type memory area; and the restoring, by the hardware, the context in the step (a4) refers to: loading back the content from the level 1 sub-memory area in the second-type memory area into the Caller-save type general-purpose register.

3. The interrupt control method based on RISC-V according to claim 2, wherein the step (a3) further comprises a nested interrupt, and the nested interrupt comprises the steps of:

(c1) when the processor is handling the first interrupt event, receiving and responding to a second interrupt request, and stopping handling the first interrupt event;

(c2) jumping, by the processor, to a second interrupt entry; meanwhile, updating the value of the control and status register set, storing the content of the Caller-save type general-purpose register before handling the second interrupt event into the level 2 sub-memory area of the second-type memory area, and/or storing the content of the control and status register set into the level 2 sub-memory area of the first-type memory area;

(c3) handling, by the processor, a second interrupt event; and (c4) once the second interrupt event is completed, returning to continue handling the first interrupt event; and meanwhile, loading back the content from the level 2 sub-memory area of the second-type memory area into the Caller-save type general-purpose register and/or loading back the content from the level 2 sub-memory area of the first-type memory area into the control and status register set.

4. The interrupt control method based on RISC-V according to claim 3, wherein sub-memory areas of the first-type memory area are set from the level 2 sub-memory area to a level m sub-memory area, sub-memory areas of the second-type memory area are set from the level 1 sub-memory area to a level n sub-memory, and m>n;

when the processor sends out an $n+1^{th}$ nested interrupt in the process of handling an $n^{th}$ interrupt event, the following steps are executed:

(n1) receiving and responding to an $n+1^{th}$ interrupt request, and stopping handling the $n^{th}$ interrupt event;

(n2) jumping, by the processor, to an $n+1^{th}$ interrupt entry, and meanwhile, storing the content in the control and status register set before handling an $n+1^{th}$ interrupt event begins to be processed into a level n+1 sub-memory area of the first-type memory area, and then protecting the content in the Caller-save type general-purpose register before handling the $n+1^{th}$ interrupt event by software, without accessing the second-type memory area;

(n3) handling, by the processor, the $n+1^{th}$ interrupt event; and (n4) once the $n+1^{th}$ interrupt event is completed, restoring the content in the Caller-save type general-purpose register by software, then returning to continuously process the n th interrupt event, and meanwhile, loading back a content from the level n+1 sub-memory area into the control and status register set.

5. The interrupt control method based on RISC-V according to claim 4, wherein the step (n2) is implemented by setting a hardware memory area enhanced control bit HS_ENHANCE to 1;

a programmable-fast interrupt control register is added, and the programmable fast-interrupt register comprises the hardware memory area enhanced control bit;

when HS_ENHANCE is 1, when the $n+1^{th}$ interrupt occurs, the program jumps and stores the content in the control and status register set before handling the n+1 th interrupt event into the level n+1 sub-memory area of the first-type memory area without accessing the second-type memory area, and then the content in the Caller-save type general-purpose register before handling the $n+1^{th}$ interrupt event is protected by software; after the interrupt handling is finished, the software restores the content of the Caller-save type general-purpose register, returns to continuously process the n th interrupt event and simultaneously loads back the content from the level n+1 sub-memory area of the first-type memory area into the control and status register set; and when HS_ENHANCE is 0, the interrupt is masked, and the $n+1^{th}$ interrupt does not occur.

6. The interrupt control method based on RISC-V according to claim 5, wherein the method of updating the value of the control and status register set in the step (c2) comprises: the control and status register set containing a machine mode status register, and the machine mode status register containing an interrupt enable bit MIE; when MIE=1, maintaining interrupt enable; and when MIE=0, masking the interrupt; and when any one of the following conditions occurs in the an interrupt response process, setting MIE to be 0; otherwise, setting MIE to be 1:

when the nested interrupt is closed or the first-type memory area does not exist;

when the nested interrupt is opened but the first-type memory area is full; and when the second-type memory area is full and HS_ENHANCE=0.

7. The interrupt control method based on RISC-V according to claim 1, further comprising a task switching interrupt, wherein the task switching interrupt comprises the following steps of:

(b1) searching, by a task scheduler, a ready task with a highest priority in a task ready list, and determining a new task to be switched;

(b2) saving an original task context to an original task stack space; and (b3) masking all interrupts; and after the interrupts are masked, popping up a context content from a new task stack space, returning to a breakpoint of a new task through an interrupt return instruction and executione, and releasing interrupt masking.

8. The interrupt control method based on RISC-V according to claim 7, wherein the method of masking all interrupts in the step (b3) comprises: adding a programmable interrupt control register which comprises a hardware memory area temporary off control bit HS OFF T; and when HS_OFF_T is 1, masking all interrupts, and not executing a popup operation of the hardware memory area when exiting the interrupts.

9. An interrupt control system based on RISC-V for use in the interrupt control method based on RISC-V according to claim 1, comprising a processor, an interrupt controller, and a Caller-save type general-purpose register, and further comprising a hardware memory area, wherein the hardware memory area is used for storing a value of the Caller-save type general-purpose register before interrupt handling during an interrupt response; and the interrupt controller is used for storing the value of the Caller-save type general-purpose register into the hardware memory area or storing a content of the hardware memory area into the Caller-save type general-purpose register.

10. The interrupt control system based on RISC-V according to claim 9, further comprising a control and status register set, wherein the hardware memory area is used for storing a value of the control and status register and/or the value of the Caller-save type general-purpose register before nested interrupt handling during a nested interrupt response; and the interrupt controller is used for storing the value of the control and status register and/or the value of the Caller-save type general-purpose register into the hardware memory area or storing the content of the hardware memory area into the control and status register and/or the Caller-save type general-purpose register.

11. The interrupt control system based on RISC-V according to claim 10, wherein the control and status register set comprises a programmable fast interrupt vector table mode register, the programmable fast interrupt vector table mode register contains a mode bit MODE, when MODE=1, an absolute address is stored in the vector table, and when MODE=0, a jump instruction is stored in the vector table.

12. The interrupt control system based on RISC-V according to claim 10, wherein the control and status register set further comprises a programmable interrupt control register, and the programmable interrupt control register comprises a hardware memory area temporary off control bit HS_OFF_T;

when HS_OFF_T=1, interrupt masking is opened and an operation of restoring the Caller-save type general-purpose register by the hardware memory area when exiting the interrupt, and an interrupt exit instruction makes the HS_OFF_T to 0; and when HS_OFF_T=0, no effect is produced on interrupt enable.

13. The interrupt control system based on RISC-V according to claim 11, wherein the control and status register set further comprises a programmable fast interrupt control register, and the programmable fast interrupt control register comprises a hardware memory area enhanced control bit HS_ENHANCE;

when HS_ENHANCE=1, the a first-type memory area is not full and the a second-type memory area is full, during an interrupt response, the content of the Caller-save type general-purpose register is protected by software, and the content of the control and status register set is stored in the first-type memory area; and when exiting the an interrupt, the content of the Caller-save type general-purpose register is restored by software, and the content is loaded back from the first-type memory area into the control and status register set; and when HS_ENHANCE=0, neither the first-type memory area nor the second-type memory area is full, during an interrupt response, the content of the Caller-save type general-purpose register is stored in the second-type memory area, and the content of the control and status register set is stored in the first-type memory area; and when exiting the interrupt, the content is loaded back from the second-type memory area into the Caller-save type general-purpose register, and the content is loaded back from the first-type memory area into the control and status register set; and when the second-type memory area is full, the interrupt is masked.

14. The interrupt control system based on RISC-V according to claim 13, wherein the control and status register set further comprises a machine mode status register, and the machine mode status register comprises an interrupt enable bit MIE; when MIE=1, interrupt enable is maintained; and when MIE=0, the interrupt is masked; and when any one of the following conditions occurs in an interrupt response process, MIE is set to be 0; otherwise, MIE is set to be 1:

when a nested interrupt is closed or a first-type memory area does not exist;

when the nested interrupt is opened but the first-type memory area is full; and when a second-type memory area is full and HS ENHANCE=0.

15. The interrupt control system based on RISC-V according to claim 9, wherein the hardware memory area comprises a first-type memory area and a second-type memory area, the first-type memory area is used for storing a content of the control and status register set, and the second-type memory area is used for storing the content in the Caller-save type general-purpose register; and the first-type memory area comprises at least a level 2 sub-memory area, the level 2 sub-memory area of the first-type memory area is used for storing the content of the control and status register set before an interrupt preemption, the second-type memory area comprises at least a level 1 sub-memory area and a level 2 sub-memory area, the level 1 sub-memory area of the second-type memory area is used for storing the content of the Caller-save type general-purpose register before entering a first interrupt, and the level 2 sub-memory area of the second-type memory area is used for storing the content in the Caller-save type general-purpose register before the interrupt preemption.

16. The interrupt control system based on RISC-V according to claim 9, wherein one or more of a flip-flop, a latch, and a RAM type memory medium are employed as the hardware memory area.

* * * * *